Oct. 25, 1966 E. F. POLKA 3,281,514
METHOD AND MEANS FOR MOLDING HOLLOW PLASTIC PREFORMS
Filed Sept. 27, 1962
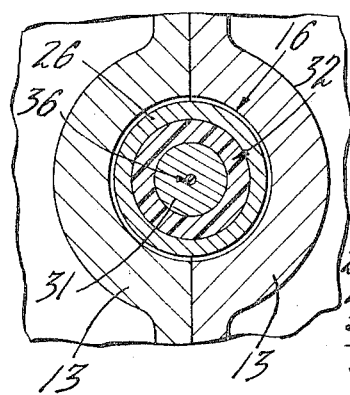
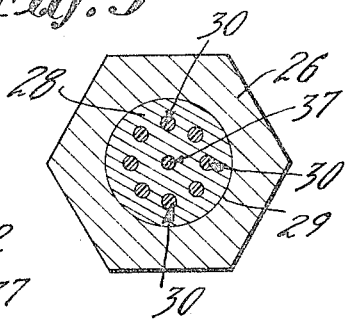
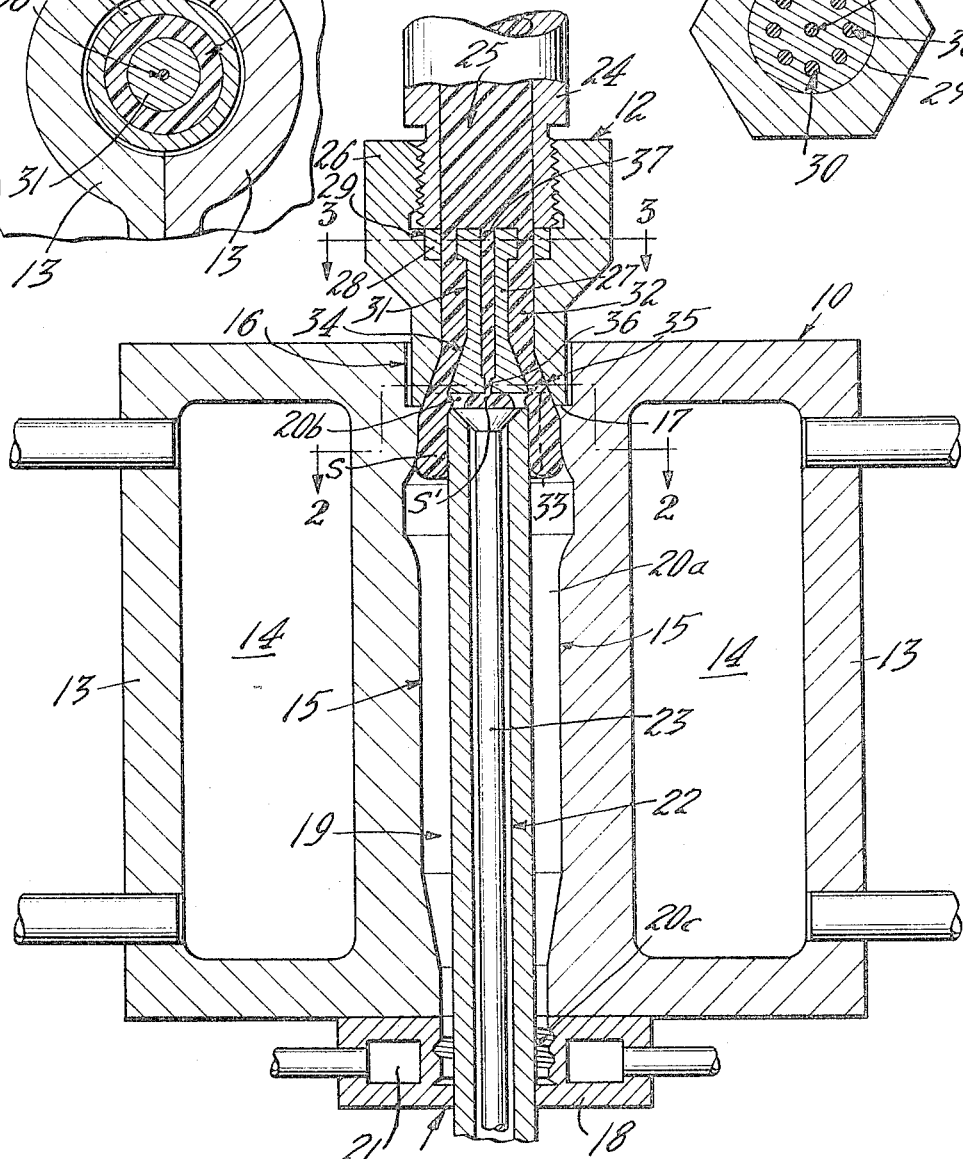
INVENTOR.
EUGEN FRANZ POLKA
BY Louis F. Heeb
George W. Reiber
ATTORNEYS

United States Patent Office 3,281,514
Patented Oct. 25, 1966

3,281,514
METHOD AND MEANS FOR MOLDING HOLLOW PLASTIC PREFORMS
Eugen Franz Polka, Algonquin, Ill., assignor to American Can Company, New York, N.Y., a corporation of New Jersey
Filed Sept. 27, 1962, Ser. No. 226,610
8 Claims. (Cl. 264—161)

This invention relates to molding of hollow tubular articles of thermoplastic material, and particularly to the molding of preforms or parisons used in the manufacture of blown plastic containers and the like.

The developments in the art of blow molding organic plastics have been rapid in recent years. Particular attention is now being given to a preliminary stage in the blow molding operation, that of forming the preform ordinarily referred to as the parison. Two basic techniques are currently practiced in forming the parison. One is by extrusion, wherein the parison is extruded as a hollow tube either externally of or within the blow mold, pinched off to close one end, and servered from the extruder. The other is by injection molding, wherein the parison is formed under hydrostatic pressure separately of the blow mold in an injection mold, usually around a removable core pin, and transferred to the blow mold while still on the core pin. There is also available in the prior art techniques combining extrusion and injection molding which seek to embody the advantages of each.

Injection molding the parison has several advantages to recommend it over extrusion forming or combined extrusion-injection forming. Among these are greater equipment flexibility, controlled distribution and orientation of plastic in the wall areas resulting in improved strength and versatility in article shape as well as material savings, reduction of stress cracks often encountered in the pinch or weld line of an extruded parison, and the elimination of such problems as neck-down, irregular and premature cooling at one end of the parison, off-center blowing, and non-uniform viscosity and extrusion rates all common to extrusion forming. In addition, injection molding the parison lends itself extremely well to finish forming of the neck area of the article prior to blowing, thereby enabling greater dimensions control of an area which, in the case of containers is ordinarily threaded, and eliminating the need for trimming or reaming a neck opening subsequent to blowing which otherwise often results in the presence of debris within the blown article.

Injection molding a threaded neck parison for the manufacture of blown plastic bottles, for example, is ordinarily done in one of two ways. Either the molten plastic is injected first into the neck area of the parison cavity at the base of the core pin and then flows around the pin to fill the entire cavity, or the mold assembly may be constructed to receive the injected plastic into the cavity at the tip or free end of the core pin. In the latter method, the core pin and neck mold are usually separable from the body mold as a unit and offers the preferred advantages of simpler construction, greater equipment versatility, more convenient differential cooling to set the neck area while maintaining the body area hot and pliable, and a convenient, easily handled carrier for transferring the molded parison to the blowing mold.

A serious problem associated with this latter method, however, has been that of core pin deflection caused by the kinetic energy of the injected plastic impinging against the tip end of the core pin. This is highly undesirable in that any unbalanced loading of the core pin, even for the brief period that injection takes place, forces it into an eccentric position and produces a parison having non-uniform wall thickness which frequently results in faulty containers.

A recently developed technique of injecting the molten plastic in an annular pattern into the mold cavity concentrically of but without impinging on the core pin has overcome the problem of core pin deflection and produces parisons of greatly improved wall uniformity while making possible some savings in material. Annular injection, however, has one fault that the conventional practice of injecting in a small, circular stream does not have, and that is the problem of adequate end fill. By end fill is meant proper and sufficient flow of plastic into the end space of the cavity defining the closed end of the parison which, in the preferred form of injection molding where the plastic is injected into the tip end of the mold cavity opposite the separable neck mold, is defined by the corresponding faces of the core pin and injection nozzle. This space is ordinarily narrow to provide an end wall more susceptible to controlled blowing and, depending on bottle geometry, may represent a considerable area over which the molten plastic must flow to effect complete fill. Although representing a very satisfactory solution to the problem of core pin deflection, annular injection in those instances where the end space of the cavity is quite narrow and large in area frequently fails to provide adequate filling of this space, thereby creating occasional imperfections in the closed end of the parison with consequent rupture of this wall when blown.

An object, therefore, of the present invention is to overcome the problem of wall imperfections in injection formed parisons.

Another object of this invention is to provide method of and means for injection molding parisons having sound wall structure.

Still another object of this invention is to provide method of and means for forming parisons by annular injection while ensuring complete and uniform fill of the parison mold cavity.

Yet another object of this invention is to provide a method of and means for injection molding a closed-end parison having uniform and sound wall structure throughout.

To the accomplishment of these objects, the present invention contemplates for use with a conventional parison mold an injection nozzle having separate and distinct flow passages for directing separate streams of molten plastic into different spaces of the mold cavity simultaneously. The nozzle is appropriately constructed in relation to the mold itself so that a main or principal stream of molten plastic is directed axially and concentrically of the core pin into the annular space to form the side wall of the parison and a secondary stream is simultaneously injected into the narrow end space at the tip of the core pin, the distinct streams merging in the mold cavity in a coalesced mass to form a parison having sound and uniform wall characteristics.

Numerous other objects and advantages of the invention will be apparent as it is better understood from the following description, which, taken in connection with the accompanying drawings, discloses a preferred embodiment thereof.

Referring to the drawings:

FIG. 1 is an elevation view in section of a preferred form of the apparatus embodying the present invention.

FIG. 2 is a sectional view taken substantially along lines 2—2 of FIG. 1.

FIG. 3 is a sectional view taken substantially along lines 3—3 of FIG. 1.

In the illustrated embodiment of the invention, there is shown a parison injection molding apparatus comprising a body mold generally designated 10, a core pin-neck mold assembly generally designated 11, and an injection nozzle generally designated 12, the latter being connected to and in communication with a controlled-flow plasticizer or feed device (not shown).

The body mold 10 may be of any conventional construction and is here shown as comprising a pair of mold sections 13, 13 which are relatively moveable into cooperating engagement along a split line coincident with the longitudinal axis of the nozzle 12. These mold sections are customarily hollowed-out to provide cavities 14, 14 through which a heating medium, such as hot oil, may be circulated to regulate the temperature of the mold. Both mold sections have contoured inner faces 15, 15 which, together, define the outer surface of the parison wall. These faces may be of any desired configuration and, indeed, it is a principal advantage of injection forming that these surfaces may be of varied contour to produce a parison having any desired wall cross section. The mold sections 13, 13 are recessed at one end to provide a well 16 to receive the nozzle 12, and are provided with an annular shoulder or ledge 17 at the base of the well 16 against which the nozzle seats to close the mold in tight sealing relation.

The core pin-neck mold assembly 11 comprises a neck mold 18 and a core pin 19 mounted perpendicularly to and concentrically of the neck mold. These elements are preferably operable as a unit and are relatively moveable into cooperative relation with body mold 10 from a position opposite the nozzle 12, thus closing the other end of the mold to define a parison mold cavity 20. As shown, cavity 20 comprises a generally cylindrical or annular space 20a defining the main body wall of the parison to be formed, an end space 20b defining the closed end of the parison, and a neck space 20C which, of course, is provided by the neck mold and is usually appropriately contoured to produce male threads on the neck of the parison.

The neck mold itself may be segmented or integral, depending on operating procedure, and is customarily provided with a passage 21 through which a cooling medium may be circulated to facilitate rapid setting or solidification of the neck portion of the parison.

Core pin 19 is adapted to extend substantially the full length of mold sections 13, 13 to define the inner surface of cavity 20, terminating just short of nozzle 12 and defining therewith space 20b. In many instances, it is desirable for the core pin to have a very great length to diameter ratio and it is for this reason that nozzle 12 is constructed to inject the molten plastic in an annular pattern, a feature shortly to be more fully described. Where the assembly 11 is to remain intact and serve as a carrier for transferring the molded parison to a blowing mold (not shown), the core pin may also be provided with a center bore 22 and a valve stem 23 for the passage and regulation of gas flow, in which case core pin 19 serves as the blow pin in the subsequent blowing operation.

Nozzle 12 is shown comprising a body or shank 24 having a central passage 25, a cap 26 threaded to the end of the shank and engageable in well 16 against ledge 17 of body mold 10, and a center core or plug 27 concentrically mounted within cap 26. Plug 27 is provided at its inner end with a flange 28 which seats within a recess 29 in cap 26 and is secured therein when the cap is threaded onto shank 24. As shown in FIG. 3, flange 28 is provided with a plurality of openings 30 which provide communication between central passage 25 and the nozzle outlet. The main portion of plug 27 extends away from flange 28 in the form of a cantilevered stem 31, which stem is concentrically aligned with cap 26 and defines therewith an annular passage 32 (see FIG. 2) which extends into an annular orifice 33 overlying annular space 20a of the mold cavity 20. As hereinbefore indicated, annular orifice 33 is appropriately disposed with respect to the mold cavity so that the molten plastic flowing through passage 25, openings 30 and annular passage 32 will enter space 20a in an annular stream S concentrically of the core pin 19 but without impinging on the core pin to thereby avoid undesirable deflection. In its preferred form, plug 27 is tapered outwardly as at 34 at the free end of stem 31 and the inner wall of cap 26 is correspondingly chamfered as at 35 to provide divergence to annular passage 32. In this form, injected stream S is given a radially outward as well as an axial force component to ensure that at least most of the kinetic energy of the high pressure stream is absorbed by mold sections 13, 13 and not core pin 19. Although the above described annular nozzle elements and the flow passages are shown having cross section of circular geometry, it will be understood that the word "annular" as used herein is intended to encompass diverse oval and polygonal geometry as well as purely cylindrical or circular cross sections. In fact, an important advantage of injection molding over extrusion forming, as mentioned hereinbefore, is the ability to form the parison with any desired wall cross-sectional configuration.

It will be seen by inspection of FIG. 1 that the mass of molten plastic represented by stream S would have difficulty negotiating the sharp turn at the exit to orifice 33 in order to enter and fill end space 20b between the top end of core pin 19 and the nozzle face. This is especially true where space 20b is extremely narrow and the area defined by the lateral dimensions of this space is large. Although the injection step is substantially instantaneous and the pressures are normally several hundred atmospheres, nevertheless the tortuous flow path into this space, aided and abetted by the chilling effect of the confining metal surfaces and the tendency of the plastic to take a rapid set, frequently causes imperfect fill which results in a faulty parison prone to failure when distended in the blow mold.

This problem is overcome completely by the provision of an additional or secondary flow orifice 36 disposed centrally in plug 27. The size of this orifice need be only a fraction of that of annular orifice 33, of course, since the cavity volume to be filled is considerably less. Although its exact size and location with respect to space 20b may vary slightly with different operating conditions, such as pressure, vicosity of the molten plastic, and parison geometry, it has been found that a single pin hole orifice on the order of .050 in. diameter centered on the axis of the nozzle provided adeqaute fill for those conditions and shapes presently contemplated. Being in communication with central passage 25 through a passage 37 extending through stem 31, secondary orifice 36 provides a secondary stream S' which is injected simultaneously with annular stream S to completely fill space 20b and merge with stream S in a coalesced mass to form a completely unified and sound parison wall structure. It will be appreciated that, unlike prior art nozzles where a central orifice injected a single, high energy stream into the cavity against the core pin, the kinetic energy transmitted by small stream S' against core pin 19 is negligible and that the energy of the main stream S is prevented from causing noticeable deflection of the core pin because of its direction of flow. The result, then, is an injection molded parison having a fully formed, unified wall of improved sectional uniformity.

In the form of the invention illustarted, stream S continues on into the mold cavity to completely fill spaces 20a and 20c. When the parison has taken a set, the mold sections 13, 13 are retracted and the core pin-neck mold assembly 11 is withdrawn, carrying with it the completed parison which breaks free of the sprue in the nozzle as the elements move apart. The parison may then be transferred directly to a blowing mold (not shown) to be blown into finished shape in the conventional manner.

It is thought that the invention and many of its attendant advantages will be understood from the foregoing description and it will be apparent that various changes may be made in the form, construction. and arrangement of parts of the apparatus mentioned herein and in the steps and their order of accomplishment of the method described herein, without departing from the spirit and scope of the invention or sacrificing all of its material advantages, the apparatus and process hereinbefore described being merely a preferred embodiment thereof.

I claim:

1. The method of molding hollow tubular articles of plastic material which comprises the steps of providing a core pin assembly centrally within a confined cavity to form between said core pin and the walls of said cavity, an elongated annular space to shape the side wall of the article and an end space to shape an end wall of the article, simultaneously filling said spaces from a mass of said material in a molten state under pressure by flowing a first stream annularly into said annular space and a second stream directly into said end space, and severing the article after it has set from the remainder of said mass.

2. The method of molding hollow tubular articles of plastic material which comprises the steps of supporting a core pin assembly centrally within a mold shell to define an annular space closed at one end, bringing a flow nozzle into closing engagement with said mold shell at the opposite end of said annular space to a position spaced from said core pin to define an end space, said spaces thereby providing a unified cavity for forming the integral side and end walls of the articles to be molded, simultaneously filling said spaces form a mass of said material in a molten state under pressure by flowing a first stream from said nozzle into said annular space and a second stream directly into said end space, whereby the two said streams of molten material merge to form a coalesced, imperforate molded structure within said unified cavity.

3. The method of claim 2 wherein said filling step is accomplished by injecting said first stream in a continuous annular mass substantially axially of and into said annular space and injecting said second stream in a smaller mass directly into said end space.

4. The method of claim 2 and including the additional step of severing said molded structure from the two said streams upon separating of said nozzle and said mold shell.

5. The method of forming hollow, tubular parisons of plastic material and characterized as having an elongated annular wall closed at one end, which comprises the steps of supporting a core pin assembly in cantilever fashion centrally within a mold shell to define an annular space closed at one end, bringing an injection nozzle having a principal annular orifice and a secondary orifice into closing engagement with said mold shell at the opposite end of said annular space to a position spaced from the free end of said core pin to define an end space connecting with said annular space in a unified cavity of parsion shape, said principal orifice being substantially aligned with said annular space and said secondary orifice opening into said end space, simultaneously injecting separate streams of said material in a molten state under pressure from said principal and said secondary orifices into said annular space and said end space, respectively, to form in said unified cavity a coalesced imperforate molded structure, and severing said structure from said streams upon separation of said nozzle and said shell.

6. Apparatus for molding hollow tubular articles of plastic material comprising a mold shell, a core pin assembly supported concentrically within and enclosing one end of said shell, said shell and said core pin defining an annular space closed at one end, and a flow nozzle communicable with a molten mass of said material under pressure and being relatively moveable into closing engagement with said shell at its opposite end to a position spaced from said core pin to define an end space, said spaces thereby providing a unified cavity for shaping the integral side and end walls of the articles to be molded, said nozzle having a principal orifice substantially aligned with said annular space for directing a first stream of said molten material axially into said annular space and a secondary orifice separated from said principal orifice for directing a lesser stream directly into said end space, said nozzle having a common passage communicating with said orifices whereby said streams are injected simultaneously into said respective spaces to form a coalesced, imperforate molded structure in said unified cavity.

7. The apparatus of claim 6 wherein said principal orifice is annular in configuration and said secondary orifice is a small diameter hole centered within said annular orifice.

8. The apparatus of claim 7 wherein said nozzle comprises a stem having a common passage in communication with a molten supply of said material under pressure, an annular cap fixed to an end of said stem and engageable against said mold shell, and a center plug rigidly mounted concentrically within said cap, said plug and said cap having wall surfaces defining said annular orifice and a passage communicating with said common passage, said plug having a central bore therethrough forming said secondary orifice in communication with said common passage.

References Cited by the Examiner

UNITED STATES PATENTS

| | | |
|---|---|---|
| 2,431,349 | 11/1947 | Stacy. |
| 3,029,471 | 4/1962 | Adams _____ 264—97 |
| 3,069,722 | 12/1962 | Kato. |
| 3,080,614 | 3/1963 | Adams. |
| 3,081,489 | 3/1963 | Jackson et al. |
| 3,082,484 | 3/1963 | Sherman. |
| 3,107,234 | 10/1963 | Stewart _____ 264—328 |
| 3,163,693 | 12/1964 | Stenger _____ 264—329 |

ROBERT F. WHITE, *Primary Examiner.*

MORRIS LIEBMAN, *Examiner.*

M. H. ROSEN, J. R. HALL, *Assistant Examiners.*